US005525383A

United States Patent [19]

Witkowski

[11] Patent Number: 5,525,383

[45] Date of Patent: Jun. 11, 1996

[54] CONTAINER FOR DIPLAYING TRANSITORY MOVING IMAGES

[76] Inventor: Daniel D. Witkowski, 405 Cottonwood La. N., Plymouth, Minn. 55441

[21] Appl. No.: 28,283

[22] Filed: Mar. 9, 1993

[51] Int. Cl.$^{6}$ .................................................. B32B 3/30

[52] U.S. Cl. ............................ 428/30; 40/324; 206/217; 206/457; 428/34.1

[58] Field of Search ............................ 428/30, 13, 34.1; 40/324, 493; 206/217, 457; 446/151

[56] References Cited

U.S. PATENT DOCUMENTS

| | | | |
|---|---|---|---|
| 734,135 | 7/1903 | Porter | 428/30 |
| 829,492 | 8/1906 | Spiegel | 40/453 |
| 911,561 | 2/1909 | Spiegel | 40/437 |
| 946,407 | 1/1910 | Spiegel | 40/445 |
| 2,367,967 | 1/1945 | Schwartz | 40/445 |
| 2,374,371 | 4/1945 | Morch | 40/437 |
| 2,704,903 | 3/1955 | Laughlin | 428/919 X |
| 2,810,978 | 10/1957 | Chapman | 428/30 X |
| 3,484,969 | 12/1969 | Newland | 40/437 |
| 3,589,045 | 6/1971 | Rakowsky | 428/30 X |
| 3,691,971 | 9/1972 | Clarke | 428/30 X |
| 4,033,059 | 7/1977 | Hutton et al. | 428/30 X |
| 4,040,353 | 8/1977 | Lefebvre | 40/453 X |
| 4,263,737 | 4/1981 | Simon | 40/453 |
| 4,300,068 | 11/1981 | Baird et al. | 428/30 X |
| 4,396,280 | 8/1983 | Parsons | 355/52 |
| 4,789,573 | 12/1988 | Jenkinson | 428/30 X |
| 5,098,302 | 3/1992 | Sekiguchi | 434/426 |
| 5,100,330 | 3/1992 | Sekiguchi | 434/426 |

OTHER PUBLICATIONS

*The Magic Moving Alphabet Book* by Frank J. Moore.
*Turned On: Decorative Lamps of the Fifties* by Leland & Crystal Payton.
*The Incredible Moving Picture Book* by Frank J. Moore.
*The Magic Moving Picture Book* by Bliss, Sands & Co.
*Optical Designs in Motion with Moire' Overlays* by Carol Belanger Grafton.

*Primary Examiner*—Henry F. Epstein
*Attorney, Agent, or Firm*—James A. Geppert

[57] ABSTRACT

A container such as a disposable packaging container, cup, bottle, drinking glass or beverage can is provided with an upright circular or tubular wall upon which is mounted for rotation a tubular sleeve formed from transparent or translucent plastic. Complementary moiré markings are applied to the adjacent walls of the container and the sleeve so that when the sleeve is rotated about the central axis of the container, moving or animated transitory images are produced as a display for entertaining the user and attracting attention and interest.

34 Claims, 8 Drawing Sheets

CONTAINER FOR DIPLAYING TRANSITORY MOVING IMAGES

FIELD OF THE INVENTION

The present invention relates to display containers and more particularly to containers suited for displaying transitory moving images.

BACKGROUND OF THE INVENTION

Container displays that are now in use are limited in their ability to attract one's attention. It is therefore one important objective of the invention to provide a container that is particularly well suited for use as a beverage or product container which is able to display transitory moving images to attract the attention and interest of the user e.g., as a retail beverage container such as a standard beverage can for beer or soda pop as well as for use as a plastic beverage bottle such as a 12-ounce or 2-liter beverage bottle of the type sold at retail outlets and is also adaptable for use as a cup, mug or sports bottle for holding a beverage. In order to be acceptable, the container must be very inexpensive to produce, must have excellent attention-getting qualities, must be easy to use and must be durable enough to stay in good condition for a reasonable period of use.

It has been previously proposed to provide a plastic container with lenticular lenses and a piece of multi-channel plastic laminated over an image. The graphic image would appear to change when the container was viewed from different angles or moved in one's hand. This approach was not successful for several reasons including the high cost of the lenses and the cost of applying them to the container. In addition, lenticular lenses do not conform well to a curved surface such as the surface of a drinking cup and significant distortion is created when the lens material is bent. Moreover, the thickness of the lens made it difficult to nest containers inside one another for storage purposes. Consequently, lenticular lenses have generally been successfully applied to the flat bottom surface of a container, and in this position they cannot be easily seen and enjoyed.

One specific object of the invention is to provide a beverage or food container or vessel for displaying transitory or animated images through the use of a movable sleeve with a provision for reliably retaining the sleeve in place on the container, i.e., prevent it from accidentally falling off either before or during use.

Another object is to create high quality animation on a curved or tapered surface and at low cost. A further object is to create continuous animation of an image around the entire circumference of a cylindrical or frusto-conical container.

Yet another object is to provide a beverage container (a cup, bottle or can) with a sleeve for creating an animated image that can be easily turned by hand without spilling the beverage held in the container. A further object is to enable the movable sleeve to be removed for washing. Still another object is to provide a sleeve which can be rotated on a container such as a cup and yet is attached well enough so that it will not fall off when one drinks from the cup.

Another object is to provide a frusto-conical display container including a provision for assuring that transitory images can be easily seen and are visually effective from all sides of the container.

A further, more detailed object of the invention is to provide an entertaining display of the type described in which the user can remove, reposition and reapply images and patterns in different locations on the container.

These and other more detailed and specific objects of the invention will be better understood by reference to the following detailed description and figures which illustrate by way of example but a few of the various forms of the invention within the scope of the appended claims.

SUMMARY OF THE INVENTION

The invention provides a cylindrical display container for displaying transitory moving images that utilize complementary moiré patterns or graphic images printed upon or applied in a fixed position on the container and upon a sleeve which overlies the image on the container itself. The container is suited for holding liquid such as a beverage or a food and, in various forms of the invention, can comprise various forms of containers, especially disposable packaging such as bottles, cans, canisters or tins, mugs, or sports bottles for holding a beverage or food.

The container comprises a rigid container body having a cylindrical or frusto-conical upright side wall surrounding a vertical central axis located at the center of the container. The container body also includes a bottom wall and has a top portion that terminates in an upper mouth through which liquid can be introduced and removed from the container. On the outside surface of the side wall of the container is a visible moiré image that includes a multiplicity of visible moiré markings such as dots, lines, bars or other patterns.

A tubular sleeve is mounted upon the wall of the container for sliding rotary movement so that the sleeve can be rotated manually by sliding the sleeve to either the left or right about the center axis of the container wall. The sleeve is also provided with visible moiré markings such as dots, lines or bars that interact with the moiré pattern on the container when the sleeve is rotated to produce the transitory images for attracting the interest and attention of the user.

The sleeve can be a rigid and self-supporting tube or, if desired, the sleeve can be a flexible plastic film that is either self-supporting or is limp, flaccid and will not hold its own shape until placed on the container, in which case the sleeve is supported by conforming closely to the exterior wall of the container body. If desired, the plastic film can be somewhat elastic or capable of stretching slightly when mounted upon the container body so that it presses lightly against the wall of the container body, allowing friction to retain the sleeve in place.

Other forms of retaining means can be provided. For example, shoulders can be applied as separate pieces or molded into the container body above and below the sleeve to provide a recess between them for receiving the sleeve and holding it in place. If desired, a circular groove can be provided to extend circumferentially around the exterior of the container with a complementary rib on an inside surface of the sleeve which projects into the groove for allowing rotation of the sleeve with respect to the container body but preventing the sleeve from sliding off one end. Alternatively, a cap can be provided at the bottom or top of the container for holding the sleeve in place on the container, or the sleeve can have a bottom wall with a pivot or snap connection between itself and the bottom wall of the container. The snap connection allows rotation of the sleeve but will prevent the sleeve from falling off accidentally.

DETAILED DESCRIPTION OF THE INVENTION

Figure 6:
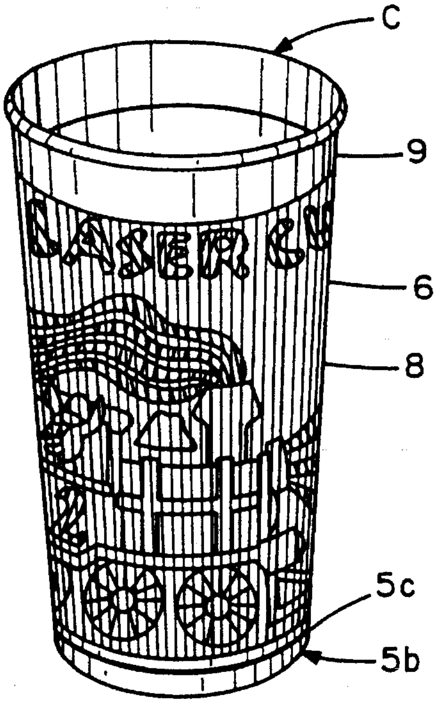
FIG. 6 is a perspective view of the container of FIG. 2 after the sleeve of FIG. 4 has been applied.
Figure 5:
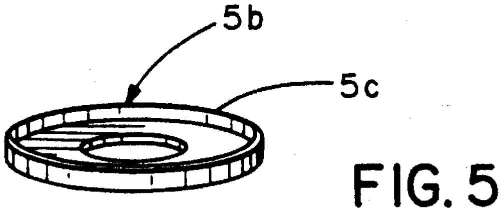
FIG. 5 is a perspective view of a retaining cap to be applied to the bottom of the container of FIG. 6 for holding the sleeve in place on the container.

Refer now to FIGS. 1–6 which illustrate one embodiment of the invention. Components that are to be assembled to form the invention depicted in FIG. 6 are shown in FIGS. 1–5. An important feature of the invention is to provide an inner moiré pattern, i.e., moiré markings on a container such as cup C and a complementary moiré pattern of markings on a movable outer cylindrical or tubular body such as the sleeve 6 of FIGS. 4 and 6.

Cup C comprises a rigid container body C' with a frusto-conical outer wall and a flat horizontally disposed circular bottom wall D. The cup C has an upper open wide mouth F through which liquid can be introduced and removed from the container. In order to provide an inner moiré pattern on the cup C, a separate printed sheet G is bonded to the cup C. The sheet G acts somewhat as a wrapper for the cup C and is rigidly bonded to it, e.g., by means of adhesive. Sheet G can be thought of as a printed blank for forming a fixed moiré pattern as a part of the cup C. In this case, sheet G is provided with lettering 2 having a moiré pattern, i.e., moiré markings which can comprise a multiplicity of vertical or nearly vertical bars as shown. Between the bars (which can be printed with black ink) are spaces which can be clear, translucent, white or some other contrasting color. Surrounding the lettering 2 is provided an opaque ink 1 which can, for example, be white in color to contrast with the black lines or bars of the moiré pattern and the lettering 2. Other parts of the drawing such as wheels of the engine at 3, are also printed with a moiré pattern, in this case vertical or nearly vertical printed lines of a dark color such as black with a contrasting color, e.g., white, between them. The sun is printed at 4 with an opaque ink surrounded by a moiré pattern of parallel lines which are in this case vertical or substantially vertical. Other parts of the drawing, such as the smoke emanating from the engine can be printed with a moiré in which different portions of the image representing the smoke include moiré lines that are parallel to adjacent lines but oriented at several different angles to produce a shimmering effect. The numerals 2, 3 and 4 depict only a few of the various textures that can be used to create moiré patterns in accordance with the invention. Besides lines, the moiré patterns can be created by using dots, diamonds, a grid pattern or other markings that simulate motion when they interact with a complementary moiré pattern on an adjacent movable sheet such as the tube illustrated in FIG. 4, as will be described more fully below.

Figure 1:
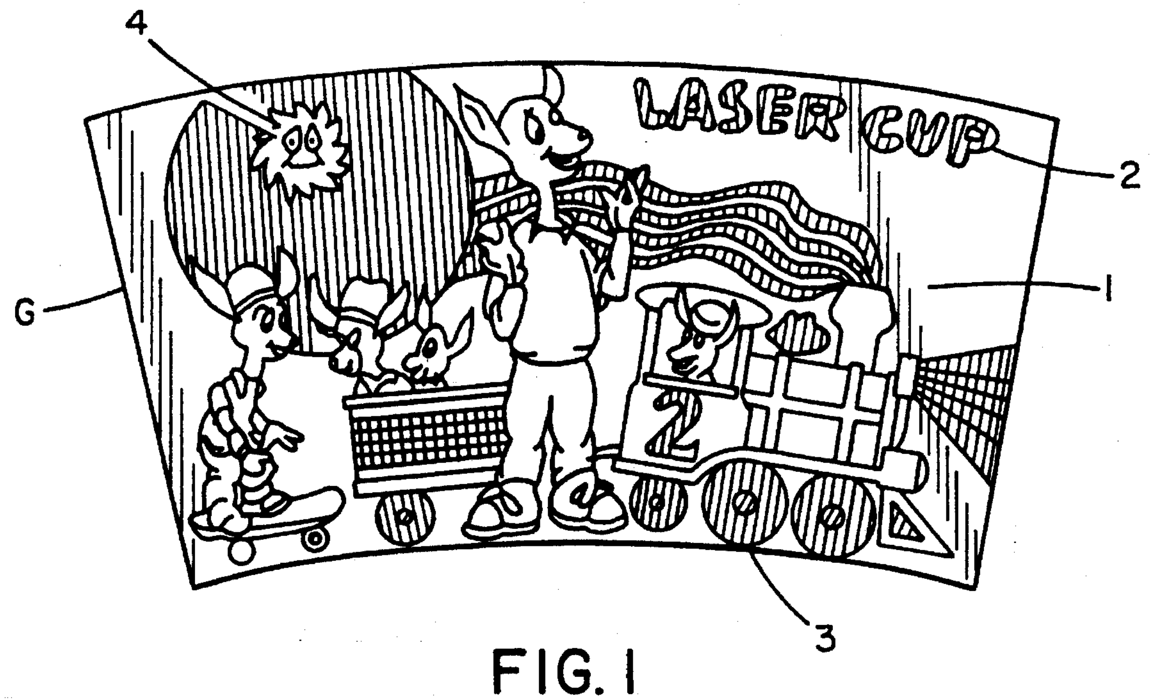
FIG. 1 is a plan view of a printed sheet that is bonded to the surface of a rigid container embodying the invention.
Figure 2:
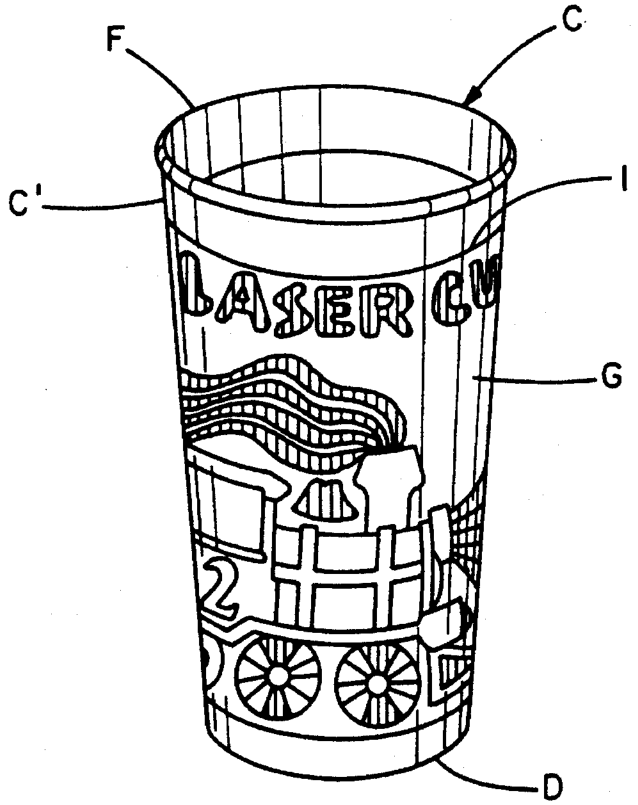
FIG. 2 is a perspective view of a container with the printed sheet of FIG. 1 secured to its outer surface.

In FIG. 2 the sheet G has been applied to the cup C by bonding it in place with an adhesive so that the sheet G encircles the cup C and forms an inner moiré pattern affixed to the frusto-conical side wall C' of the cup. With suitable printing equipment, the cup C can be printed directly with the image contained on the sheet G so that a separate sheet G and the necessity of bonding such a sheet to the cup is made unnecessary.

Figure 3:
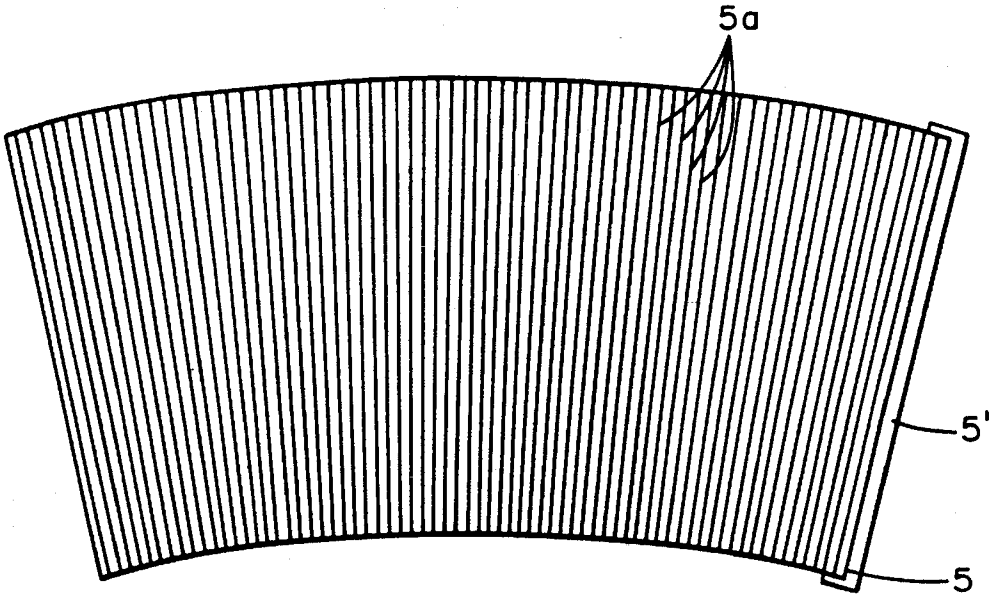
FIG. 3 is a plan view of a printed plastic sheet or blank used for forming a sleeve in accordance with the invention.
Figure 4:
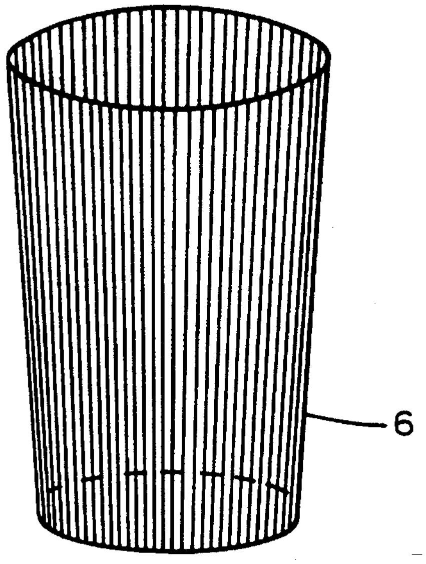
FIG. 4 is a perspective view of the sleeve of FIG. 3 after it has been formed into a tube.

To form the transitory moving images, a sleeve such as the sleeve shown in FIGS. 3 and 4 is provided. FIG. 3 illustrates the blank used for forming the sleeve of FIG. 4 prior to assembly. It will be noticed that the flat blank represented by numeral 5 has arcuate upper and lower edges and oppositely inclined side edges oriented at right angles to the intersecting top and bottom edges of the sheet. The sheet 5 which is formed into the tubular sleeve 6 is typically composed from any suitable plastic film such as clear oriented polyethylene film of between 2 mils and 12 mils in thickness and typically about 4 mils thick with vertical aligned edges bonded together by means of a strip of clear, pressure-sensitive adhesive tape 5' (FIG. 3). The sheet 5 is printed on either its inside or its outside surface with a moiré pattern which in this instance comprises generally parallel lines or bars **5*a*** that extend parallel to the side edges and intersect the arcuate top and bottom edges at right angles. The spaces between the bars 5*a* are clear so that the image on sheet G of the cup C can be seen through them.

Because both the container C and sleeve 6 taper inwardly proceeding toward the bottom, the best moiré images are formed by spreading both images and markings proceeding toward the top as shown in FIGS. 1–6. Either moiré lines or spaces between them can be tapered so that the image spreads out proportionately toward the top to occupy the entire container side wall surface. Spreading of the moiré images and markings can be accomplished in several ways, e.g., by the use of the method described in the Parsons U.S. Pat. No. 4,396,280.

In order to prepare the sheet 5 to be mounted on the cup C, it is formed or curled into a tube or sleeve 6 as shown in FIG. 4 and adjacent edges are bonded together, e.g., by means of a suitable adhesive, tape 5' or other fastening means. It will be seen that the sleeve 6 formed from the flat blank 5 now has the same configuration as the cup C, i.e., frusto-conical tapering inwardly proceeding from the top to its bottom edge. The tapered sleeve 6 is now placed on the cup C so that it surrounds the side wall C' over the sheet G containing the fixed moiré pattern as shown in FIG. 6. The sleeve 6 is formed from a flexible plastic film which, although very thin, is preferably but not necessarily self-supporting so that it retains its own shape prior to assembly on the cup C. If desired, the sleeve 6 can be limp and non-self-supporting plastic film, and in that case thin enough or made of such flexible material that it is flaccid and will not hold its own shape. One preferred form of self-supporting film is a clear self-supporting film such as a 4 mil oriented polyethylene film 5 as shown in FIGS. 3–6.

In order to secure the sleeve 6 in place on the cup C, retaining means, in this case a bottom cap 5*b*, is provided which has a flat circular bottom wall and an upwardly extending circular outer flange adapated to fit over the cup C below the sleeve 6 to provide a shoulder at 5*c* for engaging the bottom edge of the sleeve 6 to hold it in place on the cup C. The cap 5*b* thus prevents the sleeve 6 from falling off once assembled. The cap 5*b* can be secured to the bottom wall D of the cup C by a suitable adhesive or by friction.

After the complete container 8 is assembled as shown in FIG. 6, the sleeve 6 is spaced from the mouth F as indicated at 9 and is mounted loose enough on the cup C so that it can be moved manually with a rotational sliding movement upon the cup C whereby the sleeve 6 as a whole rotates about a center axis of the tubular side wall C' of the container C. The term "tubular" herein is intended to encompass both a cylindrical wall and the frusto-conical wall as shown in FIGS. 2 and 6. As the sleeve 6 is rotated, the visible moir é markings on the sleeve 6 cooperate with the moiré markings affixed to the cup C to produce transitory images such as shimmering or apparent movement of an image in the drawing of FIG. 1 from one location to another. The effect is to produce apparent movement, for example of the train wheels of FIGS. 1, 2 and 6, or the movement of human or cartoon characters such as the characters shown in FIG. 1 which are depicted with a pattern of closely spaced lines, i.e., a moiré pattern.

The transitory moving images thus produced are highly effective in attracting attention and entertaining the user. This effect can be accomplished with the invention at very little additional cost above that of an ordinary container. The moving image formed from moiré markings can also comprise any of a variety of greater or lesser known trademarks. The trademark is depicted in lines which are either parallel or almost parallel and have a spacing that is close to that of the complementary moiré lines or markings 5*a* of the sheet 5 used to make the sleeve 6 so that the trademark seems to shimmer or move as the sleeve 6 is rotated on the cup C. This attracts attention to the trademark and makes it stand out more while at the same time entertaining those viewing the cup C as the sleeve 6 is rotated.

Refer now to FIGS. 7–10A which illustrate another embodiment of the invention.

Figure 7:
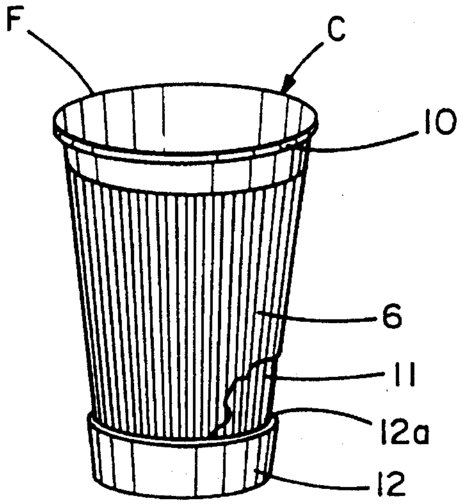
FIG. 7 is a perspective view of another form of the invention.
Figure 8:
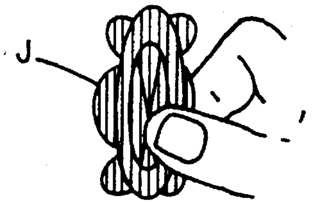
FIG. 8 is a perspective view of an applique in accordance with the invention before being applied.

FIG. 7 represents another form of the invention. Instead of having a lined sleeve 6 or grid appearing over an image as illustrated above, the illusion of movement is achieved in this case by printing a series of lines such as vertical lines 11 as shown in FIG. 7 on the cup C to provide an inner fixed moiré pattern of substantially parallel lines. The cup C formed from plastic resin, paper or other suitable composition is provided with a ridge or rim 10 extending around its mouth F.

A suitable locking or retaining mechanism is provided at either the top or bottom of the cup C to attach the cup body C to the sleeve 6 but allowing it to rotate on the outside of the cup C. The retaining means in this case comprises a cap 12 that fits over the bottom of the cup C and includes a shoulder 12*a* to contact the lower edge of the sleeve 6 for holding it in place once mounted on the cup C.

Figure 9:
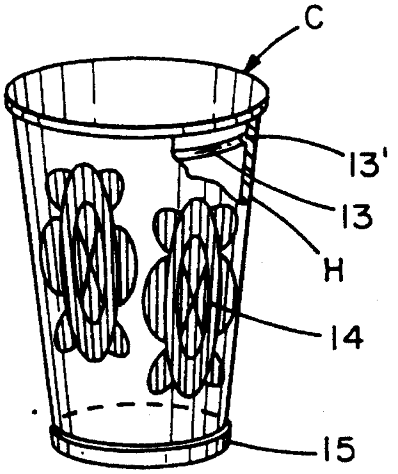
FIG. 9 is a perspective view of another form of the invention with the applique applied.

In FIG. 9 a different kind of sleeve is employed. In this case, the interior cup C is provided with a moiré pattern such as vertical or almost vertical markings, e.g., parallel lines 11 as seen in FIG. 7, and the sleeve H is a rigid tubular sleeve. The sleeve H is formed from rigid clear plastic. To provide a complementary moiré image, vinyl plastic appliques J of FIG. 8, each bearing a moiré pattern, are applied by hand to the outside wall of the sleeve H (or, if desired, to a flat surface of the container such as the bottom wall H' shown in FIG. 10) as shown at 14 in FIG. 9 and will cling to the outer surface of the sleeve H either due to an electrostatic cling characteristic of the vinyl plastic or through the action of a suitable adhesive applied to an inner surface of each applique J. Through the use of the transparent or partially transparent vinyl appliques J (or alternatively, removable labels, stickers or tapes with an adhesive backing), the invention can be used to change the images being animated by changing the position or angle of orientation of each applique J as it is applied to the container. In this way, different effects can be achieved through interaction with the complementary moiré images printed on the cup C to create the illusion of motion and animation.

To secure the sleeve H to the cup C, a retaining means is provided, in this case a circumferentially extending, horizontally disposed, outwardly opening groove 13 in the outside edge of the cup C with a cooperating inwardly extending circular rib 13' on the inside surface of the sleeve H positioned to extend into the groove 13 for enabling the sleeve H to be rotated manually about the center axis of the container C but preventing the sleeve H from sliding axially. In this way the retaining means prevents the sleeve H from being accidentally removed. If desired, an additional locking device can be attached to the bottom of the cud C, in this case a cap 15 similar to the cap 5*b* of FIG. 5. Cap 15 can be held in place on the bottom of the cup C by means of an adhesive.

Figure 9A:
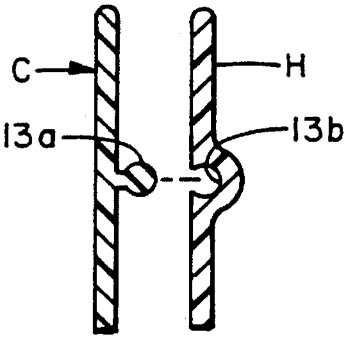
FIG. 9A is a modified form of retaining means shown greatly enlarged in a vertical sectional view taken through the wall of the container and sleeve.

FIG. 9A shows an alternate form of retaining means that can be used in place of the groove 13 and rib 13'. In this case, the outer wall of the cup C is provided with an outwardly projecting, circumferentially extending rib 13*a* adapted to snap-fit into a cooperating inwardly facing groove 13*b* in the inner wall of the outer sleeve H which in this instance is formed from a rigid self-supporting transparent plastic material such as injection-molded polyethylene terephthalate.

Figure 10:
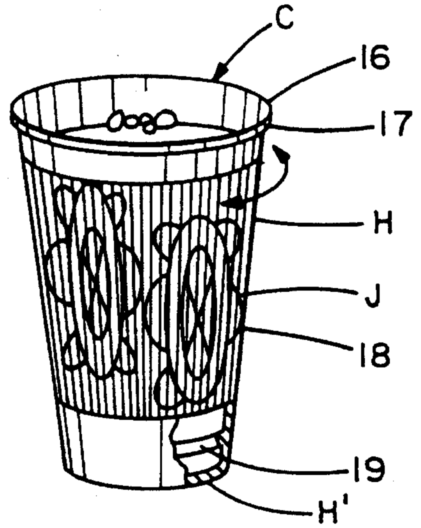
FIG. 10 is a perspective view of the container of FIG. 9 with a rotatable sleeve applied to its outer surface.

FIG. 10 depicts the container base or body C and the exterior sleeve H with its circular horizontally disposed bottom wall H'. The rigid sleeve H and its bottom wall H' act as an outer cup that is rigid, self-supporting, and provides a more durable and longer lasting product. Locking devices 19 or keep the outer sleeve H in place at all times but allow temporary removal for cleaning. The numeral 16 represents a lip of the cup body C and numeral 17 represents the upper open mouth or lip of the sleeve H.

When the sleeve H is rotated on the cup body C, the vinyl appliques J which are secured to the outer surface of the sleeve H at 18 provide transitory moving images.

Figure 10A:
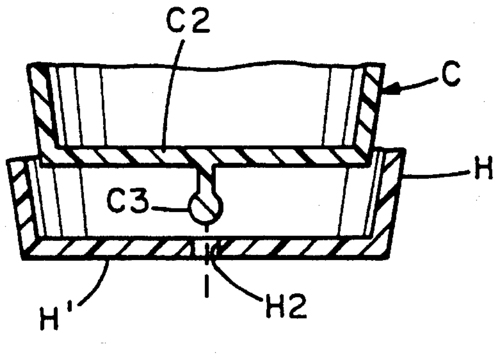
FIG. 10A is a greatly enlarged vertical sectional view of a modified form of retaining means for securing an outer sleeve to an inner container.

As shown in FIG. 10A, the bottom wall C2 of the cup C is provided with a centrally located, downwardly extending lug C3 to furnish a snap-fit connection by extending through an opening H2 in the bottom wall H' of the outer sleeve H. This securely retains the sleeve H in position on the cup C while allowing it to rotate about a central vertical axis of the cup C. The cup C can be formed from resin such as polyethylene, polypropylene or polyvinylchloride, and the sleeve H can be formed from any suitable transparent or translucent plastic resin such as polyethylene terephthalate.

Figure 13:
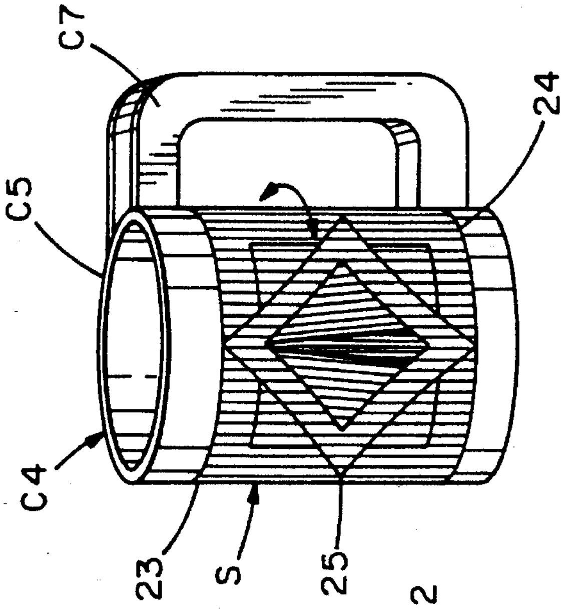
FIG. 13 is a perspective view of the complete mug assembled from FIGS. 11 and 12.
Figure 12:
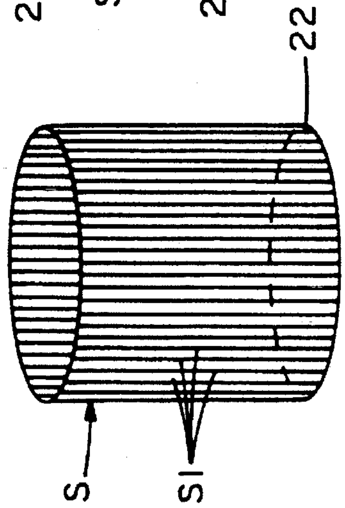
FIG. 12 is a perspective view of the sleeve to be used on the mug of FIG. 11.
Figure 11:
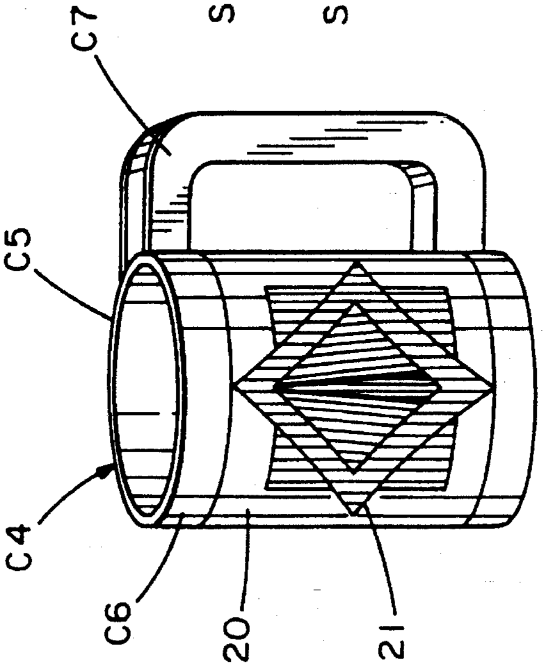
FIG. 11 is a perspective view of a mug embodying the invention with the sleeve removed.

Refer now to FIGS. 11–13 which illustrate another embodiment of the invention. In this form of the invention the container C4 is a drinking mug having an upper open mouth C5, an upright tubular body C6 which in this case is cylindrical, and a handle C7 secured to the top and bottom of the mug C4. The center portion of the exterior part of the mug C4 is printed as shown as 20 or, in the alternative, a pre-printed sheet is attached rigidly to the mug, e.g., by being bonded to it with adhesive to avoid having to print directly on the mug itself. In this case, the printed image 20 includes a moiré pattern 21 of markings such as a rectangular pattern as shown having a multiplicity of closely spaced parallel or nearly parallel lines which in this instance are positioned substantially upright.

In FIG. 12 is shown a transparent or semitransparent sleeve S formed from a cylindrical tube having a moiré pattern or image comprising in this case closely spaced, vertically disposed parallel lines S1. The sleeve S is placed on the mug C4 as shown in FIG. 13. The sleeve S is formed from a rectangular sheet of flexible plastic film such as 4 mil oriented polyethylene film. The edges of the sheet forming the sleeve S are bonded together as at 22, e.g., by means of adhesive after it is placed around the mug C4 so that the sleeve S is free to rotate on the mug with the upper and lower sleeve edges 23 and 24 fitting between the ends of the handle C7.

During use, when the sleeve S is rotated on the mug C4, the cooperating moiré patterns S1 on the sleeve and the printed pattern 21 on the mug C4 interact to produce apparent movement of the pattern and in that way display transitory moving images 25. In this case the handle C7 serves as a stop or retaining means for preventing the sleeve S from sliding off the end of the mug C4. The sleeve S is preferably drawn snugly around the cup with a certain amount of friction existing between the sleeve S and the mug C4 so that the sleeve stays in any position to which it is moved.

Figure 16:
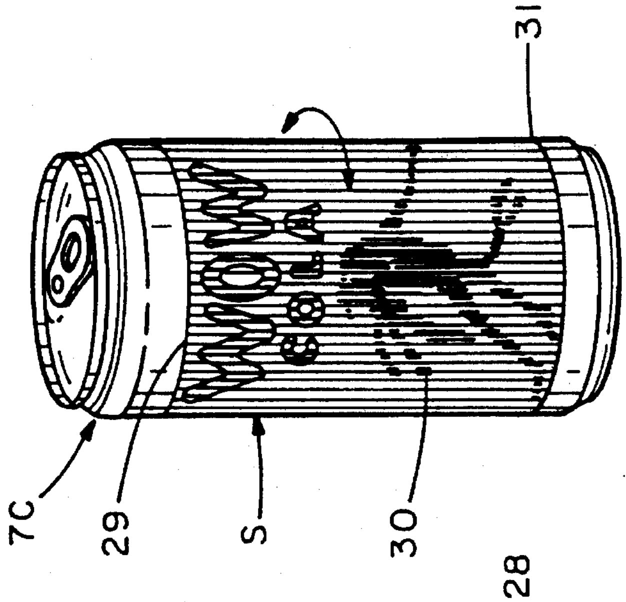
FIG. 16 is a perspective view of the container of FIGS. 14 and 15 after being assembled.
Figure 15:
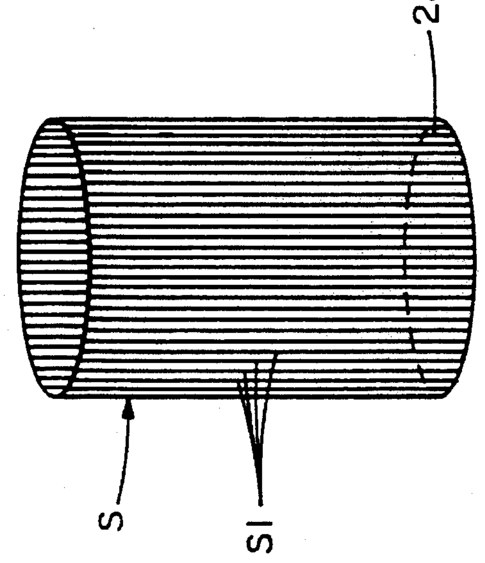
FIG. 15 is a perspective view of a sleeve to be applied to the beverage container of FIG. 14.
Figure 14:
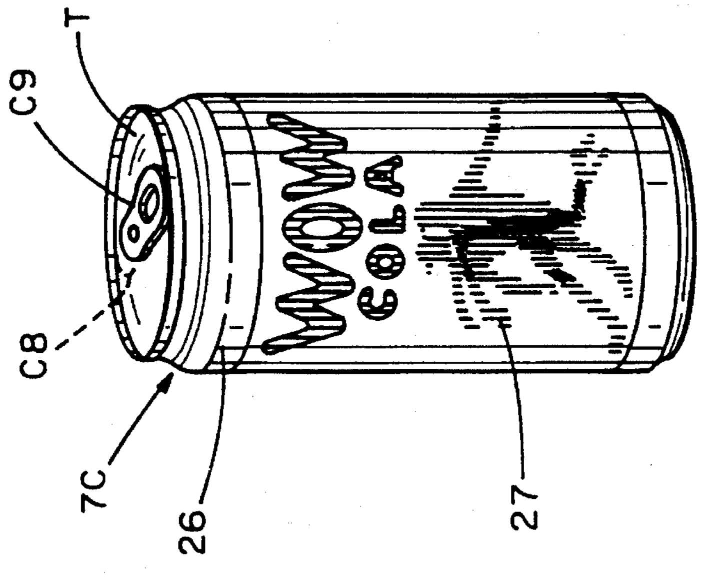
FIG. 14 is a perspective view of a beverage container embodying the invention.

Refer now to FIGS. 14–16 which illustrate how the invention can be applied to beverage cans for beer, soda pop, and the like.

Shown in FIG. 14 is a standard beverage can 7C having a top T that includes a dispensing opening C8 shown closed but which can be opened by means of a so-called "snap top opener" C9 to allow the beverage to be dispensed from the can 7C. The can 7C has the usual vertical cylindrical side wall 26 which in this case is printed as shown at 27 with a moiré image depicting words and a human figure in two positions. A rotatable sleeve S is provided as shown in FIG. 15 having a complementary moiré image similar to that shown in FIG. 12. The sleeve S is placed on the can 7C as shown in FIG. 16. The can 7C is provided with retaining means such as a circumferentially extending, downwardly facing shoulder 29 molded into the can 7C or attached later to prevent the sleeve S from moving axially on the can but allowing the sleeve S to turn on the can 7C to interact with the image 27 so as to produce apparent movement as shown, for example, at 30 in FIG. 16 as the sleeve S is rotated. A similar circumferentially extending, upwardly facing shoulder 31 can be molded into the can 7C to prevent the sleeve S from slipping off the bottom of the can.

Figure 17:
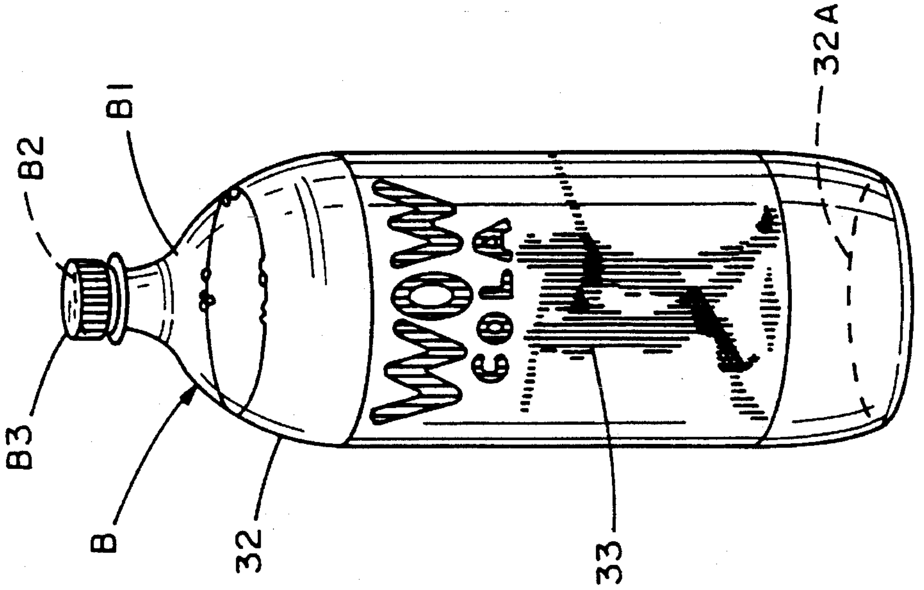
FIG. 17 is a perspective view of another form of container embodying the invention.
Figure 18:
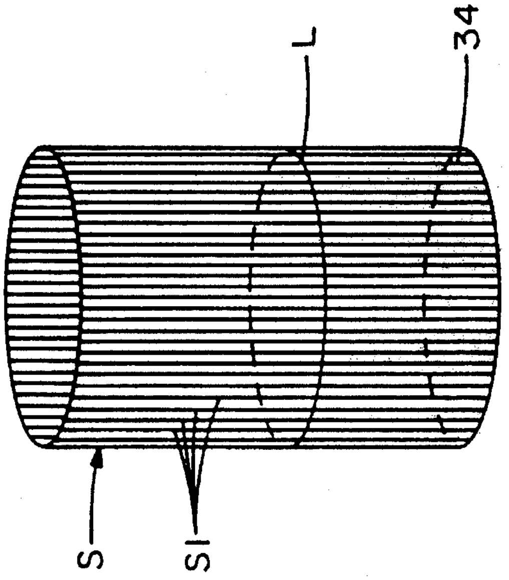
FIG. 18 is a perspective view of a sleeve to be applied to the container of FIG. 17.
Figure 19:
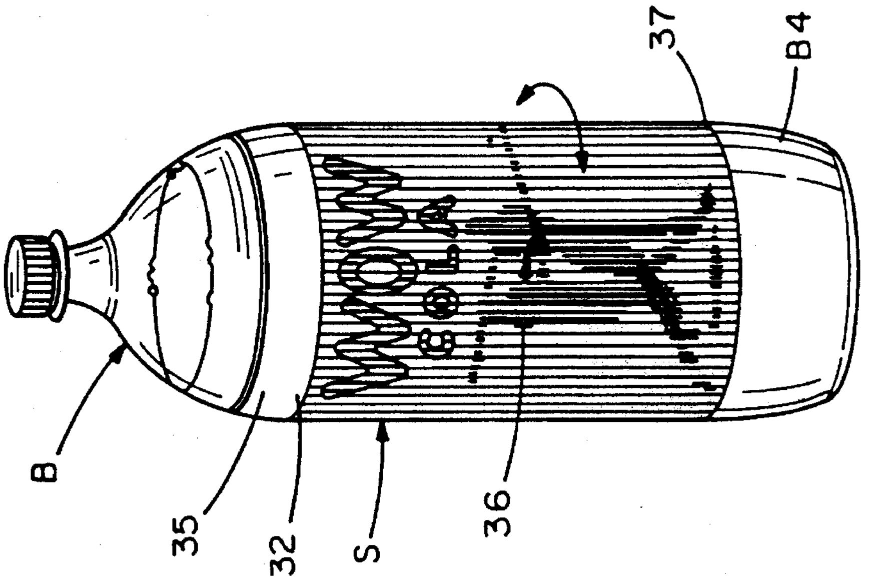
FIG. 19 is a perspective view of the container formed by assembling FIGS. 17 and 18.

Refer now to FIGS. 17–19 which illustrate the application of the invention to plastic beverage bottles such as a standard 2-liter beverage bottle. Shown in FIG. 17 is a beverage bottle B having a top portion B1 which terminates in an upper open mouth B2 that is sealed by means of a cap B3. A cylindrical side wall shown at 32 is printed with a moiré image 33 as described above or, in the alternative if desired, a pre-printed sheet bearing the moiré image 33 can be bonded to the outside surface of the cylindrical side wall 32 of the container B. The bottom wall of the container B is shown at 32A in FIG. 17.

The sleeve S shown in FIGS. 18 and 19 is similar to that of FIGS. 12 and 15, and the same letters refer to corresponding parts. The sleeve S is formed from a rectangular plastic film as described above which is curled into a cylinder, and the adjacent edges are bonded together with adhesive or an adhesive strip as shown at 34. If desired, the sleeve S can be cut transversely into two separate upper and lower pieces by severing the sleeve horizontally along a circumferentially extending separation line L. This allows independent movement of the upper and lower portions of the sleeve S for animating only portions of the underlying moiré image by moving only one part of the sleeve S at a time. The sleeve S is placed on the bottle B over the cylindrical side wall 32. A suitable retaining device, in this instance a ring 35, is placed above the sleeve S to prevent it from sliding off the top of the bottle B. A bottom cad B4 applied to the bottom of the bottle B prevents the sleeve S from sliding axially downward. The sleeve S is therefore free to be rotated on the vertical central axis of the bottle B to display transitory moving images as shown at 36 for the entertainment of observers.

Figure 22:
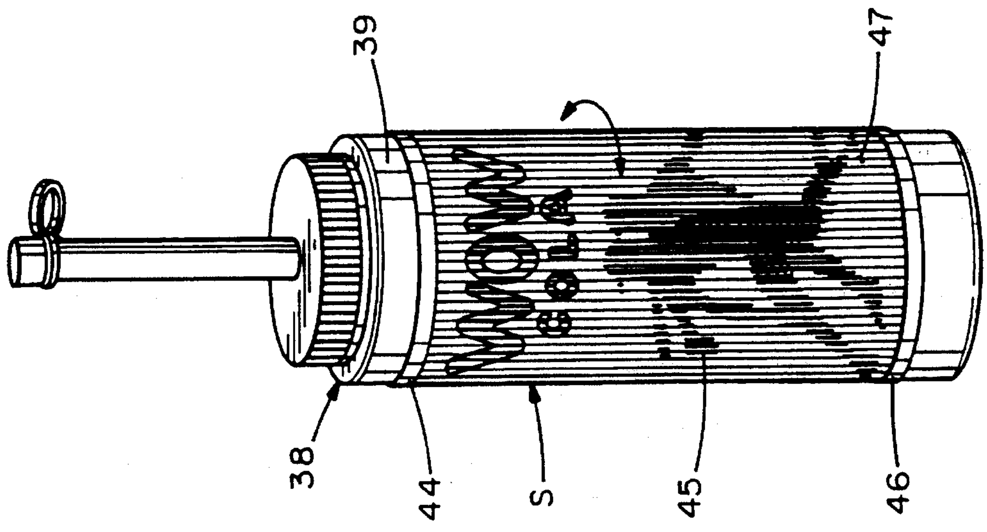
FIG. 22 is a perspective view of the complete container formed by assembling components of FIGS. 20 and 21.
Figure 21:
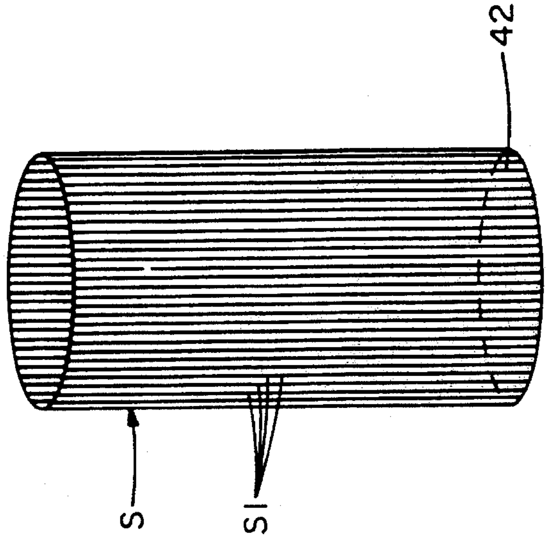
FIG. 21 is a perspective view of a sleeve for the container of FIG. 20.
Figure 20:
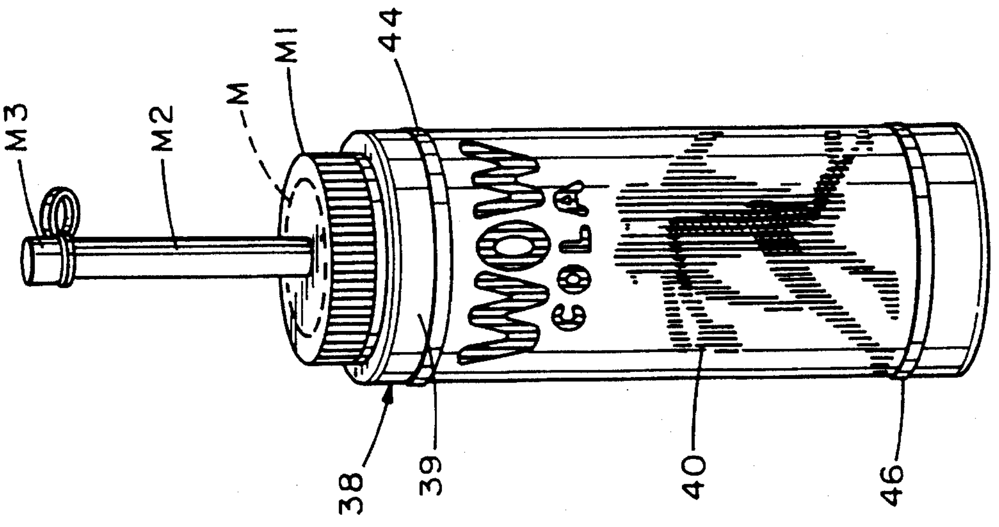
FIG. 20 is a perspective view of another form of container embodying the invention.

Refer now to FIGS. 20–22 which illustrate the application of the invention to a sports bottle. As shown in FIG. 20, a sports bottle 38 is provided with an upper open mouth M which is sealed by means of a cap M1 containing a dispensing tube M2 which is itself sealed at its free end by means of a removable cover M3. The sports bottle 38 has a cylindrical side wall 39 which is printed, for example as shown at 40, with a moiré pattern. A sleeve S of the type already described is shown in FIG. 21. Parallel edges of the sheet used to form the sleeve S are bonded together at 42 to form the sheet into a tube. As seen in FIG. 22, the sleeve S has been applied to the bottle 38. Above and below the sleeve S are locking devices or stops 44, 46 that comprise circumferentially extending rings bonded to the outer surface of the side wall 39 of the sports bottle 38 to restrict the movement of the sleeve S axially but allowing it to slide circumferentially by rotating about the central axis of the bottle 38 to display through its interaction with the inner moiré image 40 simulated movement as shown at 45 and 47.

Figure 25:
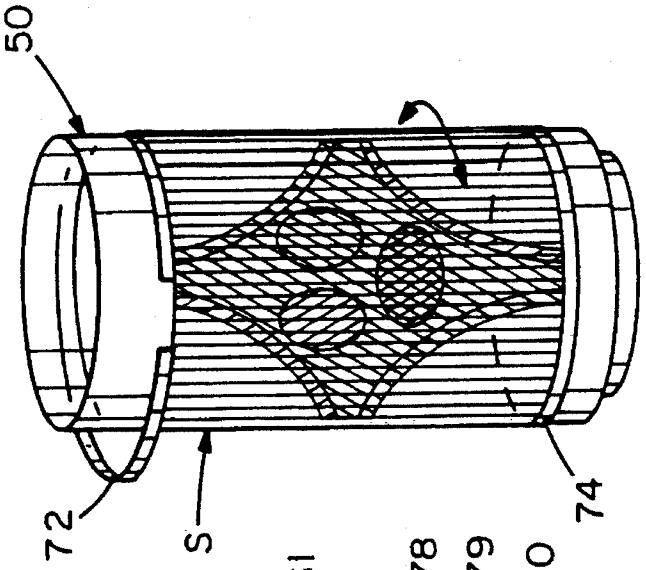
FIG. 25 is perspective view of the container of FIG. 24 with tape being applied above and below the sleeve to hold it in place on the container.
Figure 24:
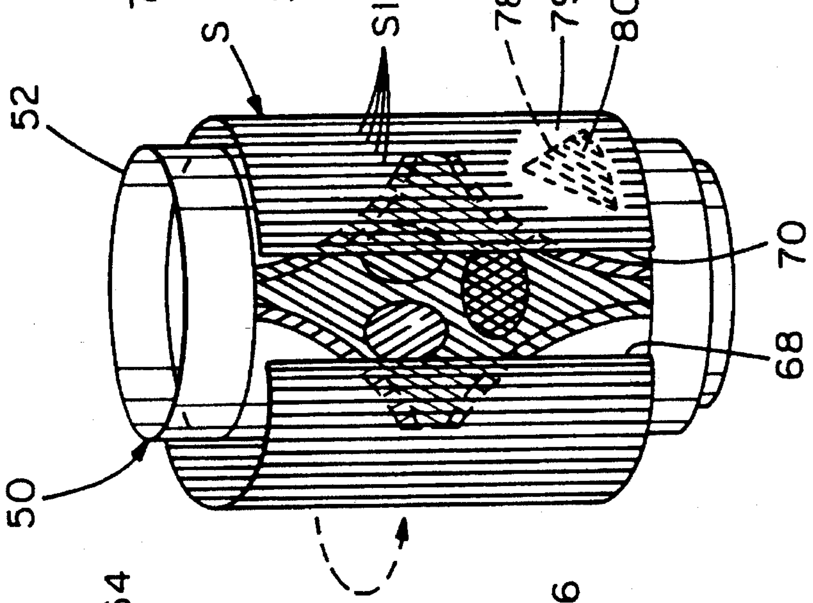
FIG. 24 is a view of the container of FIG. 23 with the sleeve being mounted on the container.
Figure 23:
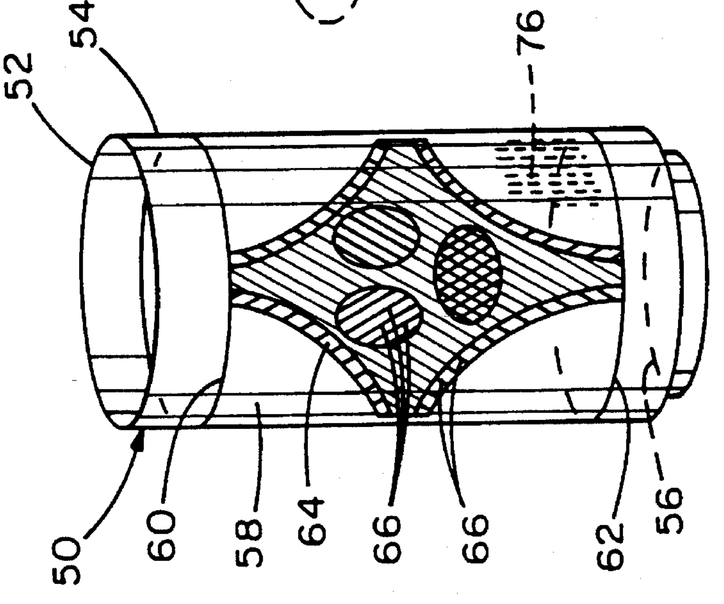
FIG. 23 is a perspective view of a container in accordance with another form of the invention.

Refer now to FIGS. 23–25 which illustrate another embodiment of the invention showing how the invention can be employed as a kit for use with an existing beverage container. In FIG. 23 is shown a drinking glass 50 having an upper open wide mouth 52, vertical side wall 54 and bottom wall 56. The drinking glass 50 represents an ordinary drinking glass that is readily available in the home of a consumer and can be formed from any known material such as plastic, glass, metal and the like. Applied, for example by bonding with adhesive, to the outside cylindrical wall 54 of the drinking glass 50 is a sheet of paper or plastic 58 bounded by top and bottom edges 60, 62. The sheet 58 is pre-printed with a moiré image 64 much of which consists of closely spaced parallel or almost parallel lines 66. In the alternative, the moiré pattern 64 can comprise a vinyl plastic film decal or applique which has electrostatic cling properties or adhesive for bonding it to the underlying drinking glass 50.

The kit also includes a sleeve S similar to that described in FIGS. 12 and 15. The sheet forming the sleeve S is rectangular in shape and is wrapped by the user as shown in FIG. 24 around the drinking glass 50 over the moiré pattern 64 with the aligned vertical edges 68, 70 brought together and bonded to one another with a suitable adhesive as shown in FIG. 25 so that the sleeve S is snug on the drinking glass 50 but free to rotate about the central vertical axis of the glass 50. Strips of adhesive tape 72 and 74 provided in the kit are then applied to the cylindrical wall of the glass 50 above and below the sleeve S to prevent it from sliding axially but allowing it to rotate freely. The adhesive strip 74 is shown already applied and the strip 72 is shown in the process of being applied.

Many variations can be made in the cooperating interactive pattern of moiré images. For example, as shown at 76 in FIG. 23, a moiré image applied to the sheet 58 is composed of a series of parallel, vertically disposed lines which consist of black or colored ink. A complementary moiré image 78 is printed on the sleeve S, but in this case the complementary moiré image 78 (shown as a triangle) is composed of a multiplicity of parallel openings between parallel bars or lines which are printed with white or colored ink. The image 78 on the rotatable sleeve S can comprise brightly colored or white ink covering large areas e.g., at 79 with transparent areas 80, i.e., "windows" bearing moiré patterns in selected areas This eliminates the need for a sleeve having dark lines on top of a moiré design applied to the container. Through this arrangement, I have reversed the standard arrangement of a moiré display. The use of colored or white ink 79 on sleeve S animates only those portions of the image that the designer would like to see move, i.e., those parts in which the fixed moiré pattern is visible through the transparent windows 80 without having to see a line or grid pattern throughout the entire artwork.

The invention thus makes possible an inexpensive and yet easy to use kit which can be sold separate from a container but which can be applied to a variety of cups, glasses or other drinking vessels found in the home and to provide an interesting display for the user.

The invention also provides a very inexpensive yet attractive and attention-getting display for containers such as disposable beverage and food containers. The sleeve forms a ring around the container to provide a form of animation on the surface of the container that furnishes a continuous band of animated material encircling the container and creating the illusion of movement on all sides as the sleeve is rotated. The invention is also considered safe for children of all ages and provides amusement for both young and old.

Many variations of the present invention within the scope of the appended claims will be apparent to those skilled in the art once the principles described herein are understood.

What is claimed is:

1. A container for holding a liquid or other product and for displaying transitory moving images on an outside surface thereof, said container comprising, a container body having an upright side wall, a bottom wall and a top portion that terminates in an upper mouth through which liquid or other product can be introduced and removed therefrom, said side wall having fixed visible moiré markings on the exterior surface thereof, a transparent or translucent rotatable sleeve mounted in closely adjacent slidable contact upon the exterior surface of the side wall of the container body for rotational sliding movement upon the container body whereby the sleeve can be rotated manually by sliding the sleeve so that the sleeve rotates about a center axis of the side wall, and said sleeve has visible complementary moiré markings thereon that cooperate with the fixed moiré markings on the container to produce transitory images when the sleeve is rotated manually about the center axis of the container.

2. The device of claim 1 wherein the container is a beverage container.

3. The device of claim 1 wherein the container is a retail shipping and dispensing container for storing and selling a beverage or food product and a cap is removably connected to the mouth of the container.

4. The container of claim 1 wherein the container is frusto-conical and has a side wall which tapers centrally proceeding toward the bottom of the container and at least some of the moiré markings comprise a multiplicity of tapered moiré markings or tapered spaces between such markings that are wider at the top of the container than at the bottom thereof.

5. The device of claim 1 wherein a retaining element is operatively associated between the sleeve and the container to prevent the sleeve from sliding off the container.

6. The container of claim 5 wherein the retaining element is a cap bonded to the bottom wall of the container for forming an upwardly facing shoulder to engage a bottom edge of said sleeve so as to hold the sleeve in position on the container.

7. The container of claim 5 wherein the retaining element comprises a circumferentially extending groove in the container body, said sleeve has a complementary rib thereon projecting centrally into said groove whereby engagement of the rib with the groove permits rotation of the sleeve upon the container body but prevents accidental removal thereof.

8. The container of claim 1 wherein the container comprises a mug, the sleeve comprises a flexible plastic sheet in tubular form applied to an outside surface of said mug and the mug includes a handle connected to the container body and located externally of the sleeve.

9. The container of claim 1 wherein the container comprises a sports bottle having a side wall, an open top and a closed bottom, a closure for the open top and a tube extending through the closure of the container through which a beverage can be expelled from the container.

10. The container of claim 1 wherein the sleeve has a bottom wall extending beneath the bottom wall of the container and a snap fastener is operatively connected between the bottom wall of the sleeve and the bottom wall of the container for permitting rotation of the sleeve but preventing accidental removal thereof from the container.

11. The display container of claim 1 wherein at least one of said moiré images comprises a removable applique that can be applied to the wall of the container or the sleeve or removed and repositioned in any desired location thereon.

12. The container of claim 1 wherein the sleeve comprises a flexible plastic film, said film is placed over said container and the film is retained in place upon said container by frictional engagement with an outside surface of the wall of the container.

13. The container of claim 12 wherein the flexible plastic film is elastic and the plastic film is stretched onto said container.

14. The container of claim 12 wherein both the container and the sleeve taper inwardly proceeding toward the bottom of said container whereby moving the sleeve upwardly onto the container will increase said frictional engagement between the sleeve and the container.

15. The container of claim 12 wherein said container comprises a drinking cup.

16. The container of claim 12 wherein the sleeve is held in place upon said container by frictional engagement with an outer surface of said side wall.

17. The container of claim 1 wherein both the container body and the sleeve are rigid and the sleeve is composed of a transparent plastic resin.

18. The container of claim 17 wherein the sleeve has a bottom wall and said bottom wall has a rotatable snap-fit connection with the bottom wall of the container body.

19. The device of claim 1 wherein said container includes multiple transparent or translucent tubular sleeves mounted upon said container body.

20. The container of claim 1 wherein at least some of the visible moiré markings comprise pieces of removable and replaceable plastic film having moiré markings thereon for enabling the user to apply, remove and reposition the moir é ,markings in any desired location or orientation on the wall of the container body or sleeve to produce different interactive relationships with complementary moiré markings depending upon the position in which the film is applied to the container.

21. The container of claim 1 wherein said sleeve includes colored or white printed areas interposed with transparent or translucent windows containing moiré markings, and the container body beneath the sleeve has a moiré pattern comprising dark colored or black lines, dots, or other visible moiré markings whereby the colored or white printed areas on said sleeve serve to visually block the marking underneath while the transparent or translucent areas allow the markings to show through.

22. The container of claim 1 wherein the sleeve is transparent plastic and the moiré markings on the container body comprise a line or grid pattern.

23. The container of claim 1 wherein said moiré markings on the container body comprise a pattern or design printed upon an outer surface of said container body and the moir é markings applied to the sleeve comprise parallel lines or a grid.

24. The container of claim 1 wherein said container has a circumferentially extending downwardly facing shoulder above said sleeve and a circumferentially extending upwardly facing shoulder below said sleeve for preventing the sleeve from falling off the container.

25. The container of claim 24 wherein said shoulders are molded into said container.

26. The container of claim 24 wherein said shoulders comprise strips of material bonded above and below said sleeve for retaining said sleeve in position upon the container wall and allowing the sleeve to rotate.

27. The container of claim 1 wherein the sleeve comprises a flexible sheet of transparent or translucent plastic film including a pair of vertical aligned upright adjoining edges bonded to one another for forming said sheet into said sleeve.

28. The container of claim 27 wherein the sleeve is placed on the container body so as to be held in place upon the container body by friction and can be rotated by hand on the container body.

29. The container of claim 27 wherein the container comprises a drinking cup.

30. The container of claim 1 wherein the container body includes a circumferentially extending outwardly projecting rib and said sleeve has a mating circumferentially extending groove sized so as to snap fit onto the rib for preventing the sleeve from sliding off the container body while allowing rotation thereof.

31. The container of claim 1 wherein said sleeve is divided horizontally into a pair of separate abutting sleeve portions which may be independently rotated.

32. A frusto-conical container that can be used as a cup or drinking glass for holding liquid and for displaying transitory images on an outside surface comprising, a container body having a frusto-conical side wall, a bottom wall and an upper open mouth, said side wall tapers centrally proceeding toward the bottom of the container, a frusto-conical sleeve slidably mounted on and closely adjacent to the outside surface of the container, said container body has fixed moiré markings and said sleeve has complementary moiré markings for displaying images that appear to move when the sleeve is rotated on the container relative to the fixed markings, at least some of the moiré markings comprise a multiplicity of tapered moiré lines or tapered spaces between lines, said tapered lines or spaces being arranged such that the markings or spaces are wider at the top of the container that at the bottom thereof.

33. The container of claim 32 wherein at least some of the moiré markings are applied to removable and replaceable transparent or translucent plastic film patches adapted to be temporarily secured to a portion of the container in any selected position whereby the patcher can be removed and replaced wherever desired to interact differently with complementary moiré markings.

34. The container of claim 32 wherein a design or image including moiré markings is fixedly secured to said container body and said sleeve includes moiré markings comprising a multiplicity of upright lines.

* * * * *